(12) United States Patent
Cochran et al.

(10) Patent No.: US 12,019,452 B2
(45) Date of Patent: Jun. 25, 2024

(54) APPARATUS, SYSTEM, AND METHOD OF USING DEPTH ASSESSMENT FOR AUTONOMOUS ROBOT NAVIGATION

(71) Applicant: JABIL INC., St. Petersburg, FL (US)

(72) Inventors: Howard Cochran, St. Petersburg, FL (US); Charles Martin, St. Petersburg, FL (US)

(73) Assignee: JABIL INC

( * ) Notice: Subject to any disclaimer, the term of this patent is extended or adjusted under 35 U.S.C. 154(b) by 452 days.

(21) Appl. No.: 17/042,840

(22) PCT Filed: Mar. 26, 2019

(86) PCT No.: PCT/US2019/023981
§ 371 (c)(1),
(2) Date: Sep. 28, 2020

(87) PCT Pub. No.: WO2019/191029
PCT Pub. Date: Oct. 3, 2019

(65) Prior Publication Data
US 2021/0026368 A1     Jan. 28, 2021

Related U.S. Application Data

(60) Provisional application No. 62/648,005, filed on Mar. 26, 2018.

(51) Int. Cl.
*G05D 1/00* (2006.01)
*B25J 9/16* (2006.01)
(Continued)

(52) U.S. Cl.
CPC .......... *G05D 1/0238* (2013.01); *B25J 9/1666* (2013.01); *B25J 9/1676* (2013.01);
(Continued)

(58) Field of Classification Search
CPC .. G05D 1/0238; G05D 1/0246; G05D 1/0248; G05D 2201/0207; B25J 9/1666;
(Continued)

(56) References Cited

U.S. PATENT DOCUMENTS 9,533,760 B1 *  1/2017  Wagreich ............... H04N 23/90
10,803,324 B1 * 10/2020  Shen ..................... G05D 1/0246
(Continued)

FOREIGN PATENT DOCUMENTS

CN         101595368        12/2009
CN         105899112         8/2016
(Continued)

OTHER PUBLICATIONS

Chinese Office Action issued in App. No. CN201980028502, dated Aug. 15, 2023, 9 pages.
(Continued)

*Primary Examiner* — Sohana Tanju Khayer
(74) *Attorney, Agent, or Firm* — Riverside Law LLP

(57) ABSTRACT

An apparatus, system and method of operating an autonomous mobile robot having a height of at least one meter. The robot body; at least two three-dimensional depth camera sensors affixed to the robot body proximate to the height, wherein the sensors are directed toward a floor surface and, in combination, comprise a substantially 360 degree field of view of the floor surface around the robot body; and a processing system for receiving pixel data within the field of view of the sensors; obtaining missing or erroneous pixels from the pixel data; comparing the missing or erroneous pixels to a template, wherein the template comprises at least an indication of ones of the missing or erroneous pixels indicative of the robot body and a shadow of the robot body; and outputting an indication of obstacles in or near the field of view based on the comparing.

17 Claims, 4 Drawing Sheets

(51) Int. Cl.
*B25J 19/02* (2006.01)
*G05D 1/20* (2024.01)
*G05D 1/22* (2024.01)
*G06T 7/593* (2017.01)
*G06V 20/10* (2022.01)

(52) U.S. Cl.
CPC .............. *B25J 19/023* (2013.01); *G05D 1/00* (2013.01); *G05D 1/0246* (2013.01); *G05D 1/20* (2024.01); *G05D 1/22* (2024.01); *G06T 7/593* (2017.01); *G06V 20/10* (2022.01); *G05D 1/0248* (2013.01); *G06T 2207/10028* (2013.01)

(58) Field of Classification Search
CPC ....... B25J 9/1676; B25J 19/023; G06T 7/593; G06T 2207/10028; G06V 20/10
See application file for complete search history.

(56) References Cited

U.S. PATENT DOCUMENTS

| | | | |
|---|---|---|---|
| 2004/0073368 A1* | 4/2004 | Gonzalez-Banos | G05D 1/0274 701/301 |
| 2004/0252862 A1 | 12/2004 | Camus | |
| 2008/0015738 A1* | 1/2008 | Casey | G05D 1/0238 700/258 |
| 2009/0292467 A1* | 11/2009 | McNelis | G01C 21/1652 701/300 |
| 2010/0121561 A1* | 5/2010 | Kodaira | G06V 20/588 382/104 |
| 2012/0229657 A1* | 9/2012 | Calman | G06Q 30/00 348/222.1 |
| 2014/0088761 A1* | 3/2014 | Shamlian | G05D 1/0227 700/253 |
| 2014/0350839 A1 | 11/2014 | Pack | |
| 2015/0168954 A1* | 6/2015 | Hickerson | G01S 17/89 901/1 |
| 2015/0190927 A1* | 7/2015 | Sutherland | H04L 65/60 901/1 |
| 2015/0212521 A1* | 7/2015 | Pack | G05D 1/0274 701/28 |
| 2015/0336575 A1* | 11/2015 | Zeng | G08G 1/166 701/1 |
| 2016/0259982 A1* | 9/2016 | Shivanandaiah | H04B 7/26 |
| 2016/0378111 A1 | 12/2016 | Lenser | |
| 2016/0378117 A1* | 12/2016 | Szatmary | G01S 17/89 382/153 |
| 2017/0078901 A1* | 3/2017 | Iwanaga | H04W 24/04 |
| 2017/0186223 A1 | 6/2017 | Lerner | |
| 2017/0300061 A1 | 10/2017 | Hickerson | |
| 2018/0204335 A1* | 7/2018 | Agata | G08G 1/0141 |
| 2018/0373264 A1* | 12/2018 | Madsen | A01B 69/008 |
| 2019/0035100 A1* | 1/2019 | Ebrahimi Afrouzi | G01C 21/32 |
| 2019/0092318 A1* | 3/2019 | Mei | G06N 3/084 |
| 2019/0137999 A1* | 5/2019 | Taguchi | G08G 1/165 |
| 2019/0163039 A1* | 5/2019 | Zhang | G05D 1/101 |
| 2019/0246858 A1* | 8/2019 | Karasikov | A47L 9/2894 |
| 2019/0339706 A1* | 11/2019 | Batur | G06V 20/58 |
| 2020/0057897 A1* | 2/2020 | Matsuura | G06V 20/58 |
| 2020/0151912 A1* | 5/2020 | Torikura | H04N 5/23238 |
| 2020/0339354 A1* | 10/2020 | Soto Arriaza | B65G 1/1375 |
| 2022/0050454 A1* | 2/2022 | Lacaze | G05D 1/0212 |

FOREIGN PATENT DOCUMENTS

| | | |
|---|---|---|
| CN | 107656545 | 2/2018 |
| JP | 2009279663 | 12/2009 |
| JP | 2011253377 | 12/2011 |
| WO | 2016014917 | 1/2016 |

OTHER PUBLICATIONS

Chinese Office Action issued in App. No. CN201980028502, dated Dec. 21, 2023, 6 pages.

* cited by examiner

APPARATUS, SYSTEM, AND METHOD OF USING DEPTH ASSESSMENT FOR AUTONOMOUS ROBOT NAVIGATION

CROSS-REFERENCE TO RELATED APPLICATION

This application is a national stage application of International Patent Application No. PCT/US2019/023981, filed Mar. 26, 2019, entitled: APPARATUS, SYSTEM, AND METHOD OF USING DEPTH ASSESSMENT FOR AUTONOMOUS ROBOT NAVIGATION, which claims the benefit of priority to U.S. Provisional Application No. 62/648,005, filed Mar. 26, 2018, entitled APPARATUS, SYSTEM, AND METHOD OF USING DEPTH ASSESSMENT FOR AUTONOMOUS ROBOT NAVIGATION, the entirety of which are incorporated herein by reference as if set forth in its entireties.

BACKGROUND

Field of the Disclosure

The disclosure relates generally to robotics, and, more particularly, to an apparatus, system, and method of using depth assessment for autonomous robot navigation.

Background of the Disclosure

Indoor and outdoor autonomous vehicles are a category of robotics that is quickly advancing. In particular, indoor robotic vehicles are now available for a variety of purposes, including but not limited to cleaning, patrolling and inspecting, security, inventory management, patient movement, wheel chairs, personal assistants, item transport, research, hazardous materials handling, hazardous condition assessment, and so on.

However, an autonomous mobile robot that operates in an indoor environment and which is of any significant height, such as a robot that is a meter or more in height, presents particular difficulties in navigation. This is due to the number of obstacles that may be encountered at various different altitudes, and due to what may be a significant distance between obstacle sensors on the vehicle and the floor.

The foregoing difficulties may be particularly severe when the indoor robot needs to operate in an unstructured environment—that is, operational areas that have not been modified with external markers or navigational aids that inform the robot of safe travel paths. These difficulties are yet further exacerbated when the robot must operate around untrained or inattentive personnel, or around the general public, as refined obstacle handling becomes a greater necessity for safety reasons in such environments.

SUMMARY OF THE DISCLOSURE

The disclosure is and includes at least an apparatus, system and method of operating an autonomous mobile robot having a height of at least one meter. The apparatus, system and method may include a robot body; at least two three-dimensional depth camera sensors affixed to the robot body proximate to the height, wherein the at least two three-dimensional depth camera sensors are both directed toward a major floor surface from the affixation and, in combination, comprise an at least substantially 360 degree field of view of the major floor surface around the robot body; and a processing system communicative with the at least two three dimensional depth camera sensors and comprising non-transitory computing code. The processing system may execute the steps of: receiving of pixel data within the field of view from the at least two three-dimensional depth camera sensors; obtaining missing, blocked or erroneous pixels from the pixel data; comparing the missing, blocked or erroneous pixels to a template, wherein the template comprises at least an indication of ones of the missing, blocked or erroneous pixels indicative of the robot body and a shadow of the robot body; and outputting an indication of obstacles in or near the field of view based on the comparing.

BRIEF DESCRIPTION OF THE DRAWINGS

The disclosure is illustrated by way of example and not limitation in the accompanying drawings, in which like references indicate similar elements, and in which.

DETAILED DESCRIPTION

Figure 1:
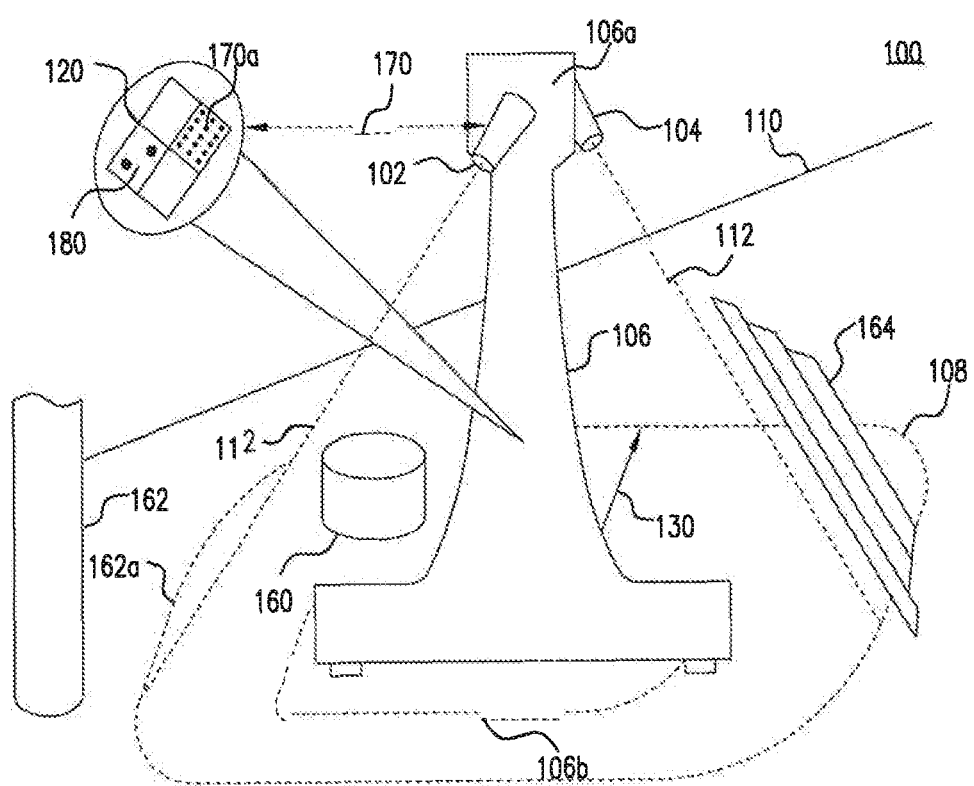
FIG. 1 illustrates an exemplary robot in an operating environment.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Furthermore, it will be understood that the terms "engine", "application", or "module", as used herein, do not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (which may work in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

The disclosure provides a highly accurate apparatus, system and method for close-range obstacle avoidance and navigation by an autonomous robot. This may be achieved by the use of advantageous sensors and sensor arrangements as compared to the known art, and by the use of improved processing methodologies for the data provided by those sensors and sensor arrangements.

More specifically, the embodiments may provide a mobile robot having a substantially 360 degree field of view (FoV) for obstacle assessment. Embodiments may use as few as two depth cameras to provide this FoV, and the geometry and obstacle-assessment techniques provided enable rich amounts of information to be extracted from the depth data provided by the FoV sensors. More particularly, embodiments provide advantageous treatment of FoV data indicative of pixels in the FoV image(s) for which depth data is missing.

Multiple possible instances may cause the aforementioned missing depth data. This missing depth data may be indicative of an obstacle in sensor range, an obstacle out of sensor range, the shadow of an obstacle out of sensor range, the robot on which the sensors reside, or the shadow of the robot on which the sensors reside. Indicating something as an obstacle when it is not leads to poor path planning for the robot, and indicating a path as clear when there is an obstacle can lead to collisions or physical injuries. Embodiments provide improved assessment of the presence or absence of obstacles using missing pixel data, and may accordingly enable improved path planning and operational safety.

In stark contrast, Current forward-looking depth cameras do not allow for firm conclusions about the meaning of missing pixels in the sensed FoV, and as such suffer from ineffective obstacle avoidance, inefficient path planning, and poor safety records. Thus, the disclosure provides for disambiguation of the meaning of missing pixels within the FoV, providing highly valid obstacle detection in proximity to the robot.

Known solutions to address the historic problems addressed by the embodiments, particularly for taller indoor mobile robots, have generally been highly complex, very expensive, and/or inadequate in performance. For example, one such solution uses an array of ultrasonic range finders. However, such a solution yields only a very coarse estimate of the position of an obstacle, thus making highly precise navigation in indoor environments very difficult. An ultrasonic array also suffers from false returns from the floor, such as may depend upon the finishing surface or angle of the floor, and is thus not able to detect slopes, cliffs, holes or steps to a required degree.

An additional prior solution may employ an array of infrared (IR) range finders. An IR array may provide more precise distance measurements than an ultrasonic array, but can only detect obstacles that intersect the sensing ray at a specific angle from the robot. Thus, in order to get a detailed view of an operating environment, a prohibitively costly and great number of IR sensors would be required. Further, this requirement that the ray be intersected at a substantially non-oblique angle makes IR sensing ill-equipped to locate slopes, cliffs, steps or holes.

The known art has also employed a planar LIDAR scanner to perform the referenced functions. Planar LIDAR provides a very precise distance and direction measurement, but only if an obstacle intersects the plane that the LIDAR sweeps. This means that the LIDAR must be mounted high enough to avoid false floor returns, and this high mounting requirement limits its ability to detect small or short obstacles. Thus, in order to detect obstacles that are much shorter than the robot, multiple LIDARs would be required to get 360-degree coverage; and, given that each LIDAR sensor costs several thousand dollars, the need for an array of planar LIDAR sensors would add prohibitively to the robot's cost.

Further, a planar LIDAR, because it senses in-plane, is unable to detect stairs, holes or cliffs. Yet further, because planar LIDAR operates in-plane, when approaching an upward slope, planar LIDAR may not detect the slope as an obstacle, or may detect a gentle slope as an obstacle, depending on the height of the sensor. If a significant slope in the floor is not timely detected, the robot may attempt to ascend a slope that is beyond its operating limitations, and if a gentle slope is detected as significant, operation may cease improperly.

A tilting planar LIDAR scanner is capable of achieving a very detailed view of up to three sides of the robot. However, at least two tilting planar LIDAR scanners are required to get a 360-degree view around the robot for larger robots, and, at a cost appreciably greater than a planar LIDAR scanner, the need for two tilting planar LIDAR scanners make this option prohibitively expensive. Further, although a tilting planar LIDAR can detect slopes, cliffs, holes and steps, it suffers from an exceedingly slow scanning rate of about 1 Hz. Consequently, this sensor type is very slow to respond to dynamic obstacles, thus making it unsafe for an environment in which living creatures that move about are also present.

A 3D depth camera, oriented horizontally, has been used for obstacle avoidance in the known art. However, because this sensor is oriented horizontally, it provides only a very limited field of view in the range of 60 to 90 degrees, and is further unable to see very short obstacles in the immediate vicinity of the robot but below the horizon of the sensor. To the extent a 3D depth camera is mounted low on the front of the robot to address the foregoing issues, it must be angled downward toward the floor and thus provides only a very limited view of what is directly in front of the robot.

And although a forward-looking depth camera may be able to detect some slopes, cliffs, steps or holes as "missing" floor depth or obstacles, it can only do so at some significant distance forward of the robot, depending on the height of the camera. Further, due to the extended forward view of such a camera when associated with a "tall" robot, to the extent the floor has relatively oblique angles, depth data may be missing from the sensing of the normal floor just because the material or lighting make sensing unreliable at the longer lateral distance from the robot at which the forward-looking depth camera is focused, and the consequent shallow angle at which the FoV meets the floor. As such, false detection of cliffs, steps and holes is likely to occur.

Some known robots use RADAR to detect obstacles using reflected radio waves. This methodology yields better accuracy than simpler sensors, such as ultrasonic or IR range finders, but provides much less environmental detail than either a LIDAR scanner or 3D depth cameras. Moreover, RADAR is much more expensive than most of the sensors referenced herein.

It is also known to use photographic cameras to detect obstacles for a mobile indoor robot. However, detecting obstacles from photographic images requires sophisticated processing, is not highly precise, and necessitates an array of such cameras to achieve 360 degree coverage.

Another disadvantage to the solutions of the known art is that glass doors, windows and walls go undetected by forward-looking depth cameras because such cameras see through such obstacles. Similarly, LIDAR simply sees through glass in most cases. Ultrasonic and IR range finders also typically fail to detect glass doors, windows and walls, in part due to the variability in reflection of sound and infrared off of glass as compared to other substances.

FIG. 1 illustrates a system 100 according to embodiments. As shown, two or more sensors 102, 104, such as cameras, such as 3D depth cameras, may be mounted substantially proximate to the top 106a of a mobile robot 106. Of course, in some embodiments, the requisite three-dimensional field of view (FoV) 108 may be provided by multiple other camera types or like-sensors at particular heights or angles other than those specifically detailed herein, rather than by the use of 3D depth cameras at the height and angles discussed with respect to FIG. 1, as will be understood to one of ordinary skill in the art in light of the discussion herein.

The sensors 102, 104 may be aimed, such as prior to active use, substantially vertically, or at an angle such as in a range of 10 degrees to 45 degrees from vertical, toward the floor 110 upon which the mobile robot 106 will operate. The angle of incidence 112 may be at a particular angle known to the software, firmware, and/or hardware that is executed by the computer processing system 120, such as may be based upon execution of code stored in the non-transitory computing memory (as discussed herein).

In an embodiment, two 3D cameras 102, 104 may be employed as shown, such as one on the front side of the mobile robot 106, and one on the rear side of the mobile robot 106. Of course, other configurations for the affixation points for cameras 102, 104 may be used in accordance with the disclosure. In accordance with the configuration illustratively provided in FIG. 1, and due to the height of the cameras, the combined FoV 108 of cameras 102, 104 may include an area of the floor 110 extending in substantially all directions from the robot 106 to a distance of up to several meters, such as in a range of 1-3 meters, and more particularly approximately 2 meters, based on the use of two depth sensors/cameras, angle of incidence 112 and the height of the top 106a of the robot 106.

Although not specifically shown in FIG. 1, it will be appreciated, in light of the discussion herein, that some embodiments may similarly employ a number of cameras greater than two, such as in instances wherein the length or breadth of the mobile robot 106 is such that more than two cameras are required to see the floor 110 in all directions around the robot 106 to a desired lateral distance 130 from the robot 106. Of course, this desired lateral distance 130 may be correspondent, such as in the algorithms of the software or firmware executed by processing system 120 as discussed herein, not only to the height or breadth of the robot, but also or rather to the capabilities of the robot 106, such as the maximum speed or turning radius of which the robot's driving hardware is capable, or such as the safety equipment or collision avoidance algorithms forming part of the robot provide for. Additionally or alternatively, a single camera may be used, such as if the single camera is capable of an approximately 360 degree FoV, or can be rotated through an approximately 360 degree FoV, or if a 360 degree FoV is not required (such as wherein the robot 106 is capable only of travel along one axis, i.e., forward and backward).

By way of non-limiting example, current 3D cameras are suitable to distinguish obstacles 160, 162, 164 that have a height of at least 2-4 cm above the floor 110, even from a camera height of 3-8 feet. Further, such cameras can distinguish slopes, holes, stairs or cliffs 164 that are as shallow as 2-4 cm, even from a camera height of 3-8 feet.

The exemplary 3D depth cameras may have a minimum lateral range 130 starting point of between 20 cm and 60 cm outward from the robot 106, and the lateral FoV would then extend outwardly about the robot from that starting point. However, because the disclosed cameras 102, 104 may look downward from a significant height on the robot, such as from 1-3 meters above the plane of the floor 110 as referenced above, obstacles 160, 162, 164 at or near ground level can be detected very close, laterally, to the robot. Indeed, in embodiments, the lateral outward reach of the FoV may have a starting point on the robot body 106 itself.

In one embodiment, the exemplary 3D cameras 102, 104 may typically have a frame rate of between 15 and 90 fps. This frame rate may provide for near-instantaneous response times to the data 170 produced from the cameras 102, 104. As such, response time for the appearance of a static or a dynamic obstacle 160, 162, 164 is limited only by the frame rate of the camera, which is minimal for the aforementioned exemplary camera, plus a very small amount of processing overhead time consumed by the processing system 120 discussed herein.

Within the FoV 130 referenced may be various elements and instances. These may include, for example, an obstacle 160, 162, 164; the shadow of an obstacle 162a; a slope, step, cliff, or hole obstacle 164; the robot itself 106; and/or the shadow 106b of the robot 106. The disclosure may allow for differentiation of the foregoing based on processing (by processing system 120 discussed below) of missing, blocked or erroneous pixels 170a in the sensor data 170 representative of the FoV as output by the aforementioned cameras 102, 104.

Accordingly, the mobile robot 106 may include one or more processing systems 120 onboard the robot 106, and these processing systems 120 may have associated therewith one or more computing memories having associated therewith non-transitory computing code which, when executed by the one or more processing systems, causes to be provided the algorithms, calculations, comparisons and relations discussed throughout. The processing system 120 onboard the robot may additionally include communication capabilities for the transceiving of communications to and from offboard the robot. By way of example, such communication capabilities may include near field communications (NFC), Bluetooth, local area network (such as WiFi), wide area network, cellular network, infrared, or other communication methodologies, as discussed further herein below with respect to FIG. 4. It will be appreciated that the onboard processing system 120 of the robot 106, to the extent the aforementioned communication capabilities are provided, may handle all principal processing, such as application of the algorithms, calculations, comparisons and relations discussed throughout, or may share principal processing at least partially or fully off board the robot 106, without departing from the disclosure.

During active sensing, the floor 110, a portion of the robot's body 106, and any nearby obstacles 160, 162, 164 may be represented in the 3D depth image data 170 produced by the sensors 102, 104 and provided to the processing system 120. As used herein, an "obstacle" may include any raised element, raised item, or raised or sloped part of the floor that extends above the plane provided by the immediately adjacent major floor surface; or any floor portion having a slope or lower portion that has a height below the plane provided by the immediately adjacent major floor surface.

In the embodiments, in order to distinguish true obstacles 160, 162, 164 from the floor 110 and the robot's own body 106 and/or its shadow 106b, the software/firmware (hereinafter also referred to as "software") executed by the processing system 120 may first create one or more templates 180 by having the sensors capture a plurality, even several dozen, sample depth images when the robot is in open space with no obstacles in the FoV. By way of example, the software may average these sample depth images together, and may store the result as the at least one template 180 for the space or location indicated. Of note, in multi-sensor, such as multi-camera, embodiments, separate templates 180 may be created for each depth sensor 102, 104.

Thereafter, the robot 106 may perform autonomous or semi-autonomous navigation, wherein the current output data 170 from the depth sensors provides monitoring for nearby obstacles 160, 162, 164 in all directions. Accordingly, when a new depth image is received, the software filters out points that belong to the floor 110 or to the robot's own body 160 by comparing the depth of each point, or pixel, in the depth image data 170 with the depth of the corresponding pixel in the template image 180 for that camera. When the pixel shows as closer in depth to the sensor 102 than the template 180 indicates, by some configurable threshold, that point is considered an obstacle by the software and an action or alert may be undertaken. When a pixel is farther in depth than is indicated by the template 180, it is considered an obstacle 160, 162, 164, such as in the form of a slope, cliff, step, or hole 164 in the floor 110.

When a pixel is "missing" from the sensing data 170, i.e., when the pixel contains no valid depth data, there are a five algorithmic possibilities for the software. The first possibility is that the area represented by that pixel is an obstacle 164 that is part of a cliff, step down or hole that is sufficiently deep from the camera that the camera 102 is unable to sense anything at that point.

The second possibility is that the pixel is part of the shadow 162a of an obstacle 162. Such shadows are common in embodiments employing optical depth cameras, in part because the ability to distinguish depth requires the target to be within the line of sight of the two or more sensing devices, such as component camera devices, at once, and so a shadow may be perceived when a nearer obstacle blocks the line of sight from one component but not the other.

The third possibility is that a sensed target at that pixel is an obstacle that is closer to the depth sensor than the minimum sensing distance of the depth sensor 102, 104. The fourth possibility is that the sensed target at that pixel is an obstacle that is formed of a material that cannot be observed by the depth sensor, such as a shiny surface at a very oblique angle to an optical camera's line of sight. The final possibility is that the pixel is part of the shadow 106a of the robot's own body 106.

Figure 2:
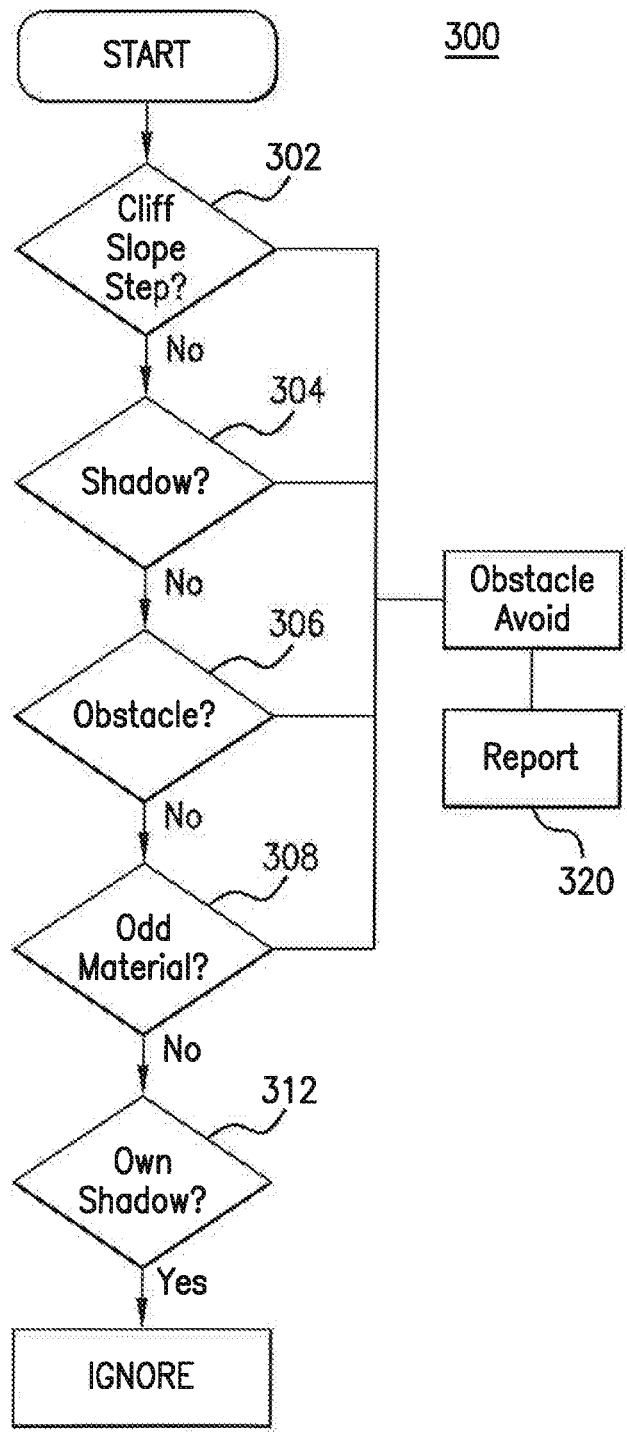
FIG. 2 illustrates an exemplary decision flow for an autonomous robot.

FIG. 2 illustrates a decision flow 300 for performance by the processing system in ones of the foregoing embodiments. More specifically, for possibility #1 (302) discussed in FIG. 1, cliffs, step downs or holes indicate obstacles that should be avoided by the robot. For possibility #2 (304) above, any obstacle that is sufficiently close so as to cast a shadow on the floor within sensor view is close to the robot and is located along the current sight line from the depth sensor to the floor. Thus, it is to be concluded that such an obstacle is in a nearby location along that sight line, and so is to be avoided, and thus the robot should react or be reacted accordingly.

For possibilities #3 (306) and #4 (308), the import of the missing pixel is that an obstacle is within depth sensor view. Thus, it is to be concluded that an obstacle is present and is likely best to be avoided, and thus the robot should react or be reacted accordingly.

It will be appreciated, for each of the foregoing instances, that the assessment by the processing system, and the correspondent reaction from the robot, may vary based on the robot's capabilities. By way of non-limiting example, a robot capable of climbing or descending steps may react or be reacted to proceed to continue moving for possibility #1. That is, if the missing pixels represent a step, and step climbing or descending falls within the capabilities of the robot, that robot may not assess the presence of an actual obstacle in possibility #1 (302).

By contrast and based on the presence of the one or more templates, possibility #5 (312), i.e., the presence of the robot's own shadow, is a case in which the missing pixel should not be considered an obstacle in the instant exemplary embodiment. This is because the corresponding pixel in the template image(s) will also indicate a missing pixel, i.e., the robot's own shadow, at the same location as in the sensed data. Such is the case because, as the template(s) is developed in open space and the robot itself will be visible in the template as a closer depth pixel to the sensor, pixels in the template that are "farther", or missing, in what is known to be open space and flat floor must indicate the shadow of the robot itself. Thus, as is the case with the robot itself in the template, any pixel lacking depth data in the template may be ignored or "passed" by the obstacle filter as constituting the shadow of the robot.

It will be understood that the software discussed herein may "report" 320 the location of all "missing" depth image pixels that are assessed, by comparison to the template, as obstacles to any governing software, such as path planning software, environment mapping software, and/or safety monitoring software. Consequently, it may be the governing software(s) that reacts the robot, and therefore the reaction of the robot may vary without departing from the spirit of the disclosure. By way of non-limiting example, path planning governing software may apply its own algorithms to assess the noted obstacle as permanent or temporary, such as based on comparisons to multiple assessments of the presence of that obstacle over time; and the robot may keep moving only if the obstacle is deemed permanent, but with a notation that the robot must traverse a path around that obstacle from the current time forward. This notation may inform the robot's path perpetually, such as without the need of additional depth assessments in the future, or a re-assessment may occur at a predetermined future time.

In an additional example and as discussed above, a floor slope may appear as an obstacle to the template filter. However, because of the detailed depth information provided in some embodiments based on use of 3D depth cameras and the disclosed template filtering, governing path planning software may measure the slope of the plane to determine whether it exceeds the safety limits for the capabilities of that particular robot before ascending or descending the slope. Of course, pixels belonging to a slope that is within capability limits may then be further filtered by the governing software, such as so that the slope is not treated as an obstacle by navigation software in the future, by way of non-limiting example.

In addition to navigation, emergency stops, and the like, the detailed observations of all obstacles near the robot, as referenced above, may enable high-precision maneuvers that would generally be infeasible using prior state of the art localization methods and traditional sensors. For example and in accordance with some embodiments, the robot may drive parallel to a nearby large structure, maintaining a target lateral distance from the structure at a precision of +/−0.5 cm or better. Similarly, the disclosed embodiments may allow the mobile robot to highly precisely engage a parking place or a docking station, by way of example.

Of additional note, the arrangement of the depth camera in the present disclosure provides improved sensing of glass doors, windows and walls. This is, in part, because glass doors, windows and walls behave like mirrors when viewed from the oblique angle of the depth cameras arranged atop a tall robot in embodiments such as that of FIGS. 1-2. The mirroring behavior causes the robot to see a reflection of itself, which then allows the glass door, window or wall to be treated as an obstacle by the processing system.

Figure 3:
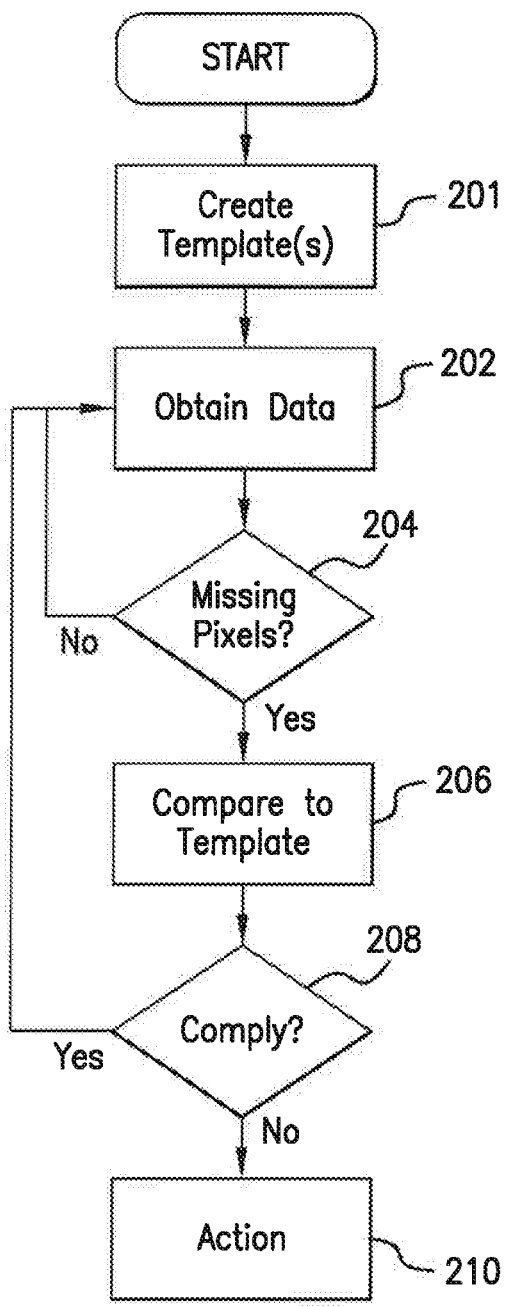
FIG. 3 illustrates an exemplary method of operating an autonomous robot.

FIG. 3 is a flow diagram illustrating a method 200 in accordance with the embodiments. In the method 200 shown, at least one template is created using sample depth images at step 201. During navigation, sensor data is obtained from a multi-3D depth camera system at step 202. This data is assessed for missing, blocked or erroneous, i.e., "missing", pixels at step 204. At step 206, the missing pixels are compared to the one or more templates (from step 201) for the operation location by a processing system. Compliance with the template(s), and hence the lack of an obstacle, or non-conformance with the template, and hence the presence of an obstacle, is assessed at step 208. At step 210, an action for the robot is indicated based on the output of step 208.

Figure 4:
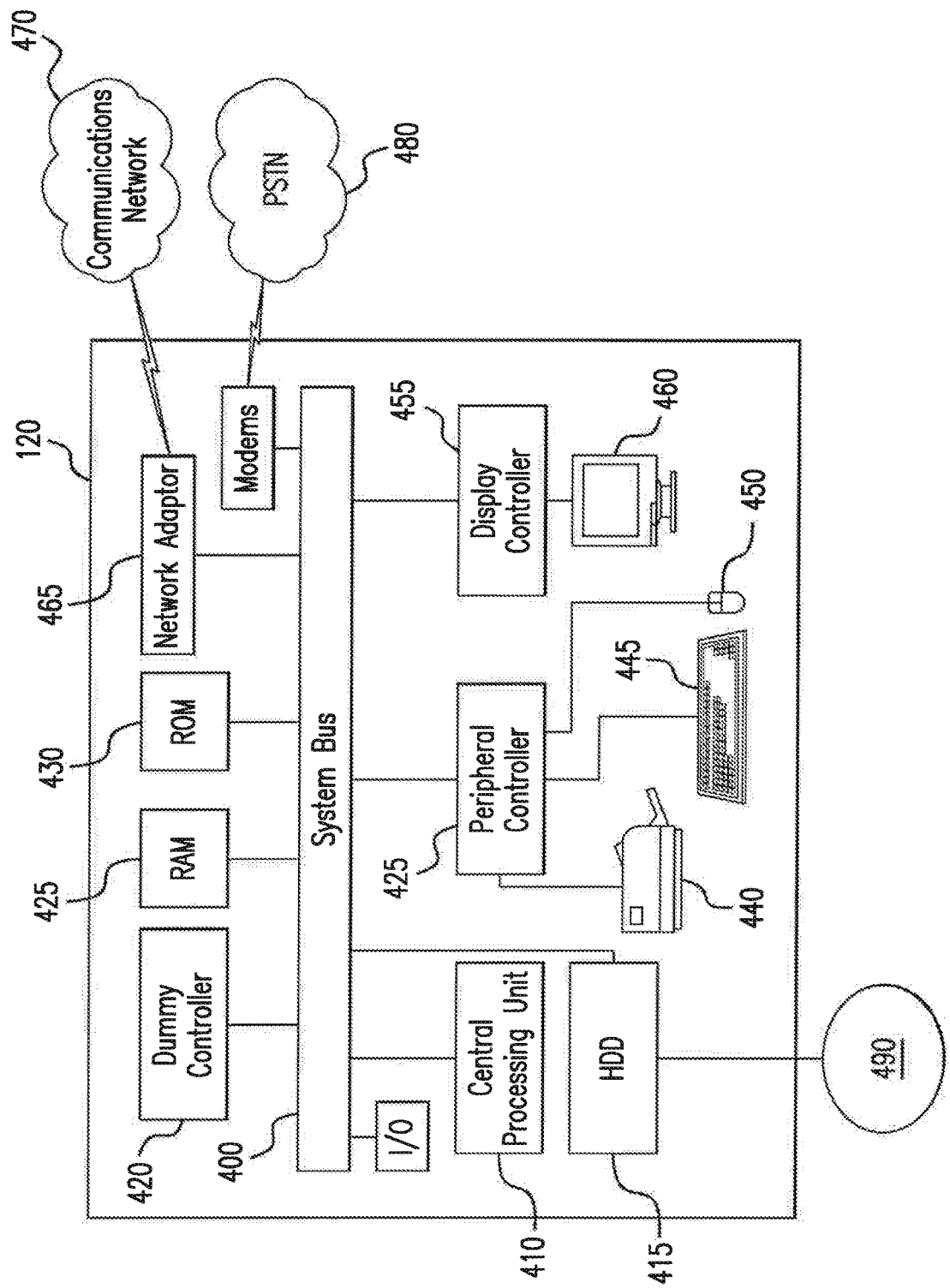
FIG. 4 is a schematic diagram illustrating an exemplary processing system.

FIG. 4 depicts an exemplary computer processing system 120 for use in association with the embodiments, by way of non-limiting example. Processing system 120 is capable of executing software, such as an operating system (OS) and one or more computing algorithms/applications 490 such as those discussed throughout. The operation of exemplary processing system 120 is controlled primarily by the computer readable instructions/code discussed throughout, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause system 120 to perform the disclosed operations, comparisons and calculations. In many known computer servers, workstations, personal computers, and the like, CPU 410 is implemented in an integrated circuit called a processor.

It is appreciated that, although exemplary processing system 120 is shown to comprise a single CPU 410, such description is merely illustrative, as processing system 120 may comprise a plurality of CPUs 410. Additionally, system 120 may exploit the resources of remote CPUs (not shown) through communications network 470 or some other data communications means 480, as discussed above.

In operation, CPU 410 fetches, decodes, and executes instructions from a computer readable storage medium such as HDD 415. Such instructions may be included in software such as an operating system (OS), executable programs/applications 490, and the like. Information, such as computer instructions and other computer readable data, is transferred between components of system 120 via the system's main data-transfer path. The main data-transfer path may use a system bus architecture 405, although other computer architectures (not shown) can be used, such as architectures using serializers and deserializers and crossbar switches to communicate data between devices over serial communication paths. System bus 405 may include data lines for sending data, address lines for sending addresses, and control lines for sending interrupts and for operating the system bus. Some busses provide bus arbitration that regulates access to the bus by extension cards, controllers, and CPU 410.

Memory devices coupled to system bus 405 may include random access memory (RAM) 425 and/or read only memory (ROM) 430, by way of example. Such memories include circuitry that allows information to be stored and retrieved. ROMs 430 generally contain stored data that cannot be modified. Data stored in RAM 425 can be read or changed by CPU 410 or other hardware devices. Access to RAM 425 and/or ROM 430 may be controlled by memory controller 420. Memory controller 420 may provide an address translation function that translates virtual addresses into physical addresses as instructions are executed.

In addition, processing system 120 may contain peripheral communications controller and bus 435, which is responsible for communicating instructions from CPU 410 to, and/or receiving data from, peripherals, such as peripherals 440, 445, and 450, which may include printers, keyboards, and/or the elements discussed herein throughout. An example of a peripheral bus is the Peripheral Component Interconnect (PCI) bus that is well known in the pertinent art.

Display 460, which is controlled by display controller 455, may be used to display visual output and/or presentation data generated by or at the request of processing system 120, responsive to operation of the aforementioned computing programs/applications 490. Such visual output may include text, graphics, animated graphics, and/or video, for example. Display 460 may be implemented with a CRT-based video display, an LCD or LED-based display, a gas plasma-based flat-panel display, a touch-panel display, or the like. Display controller 455 includes electronic components required to generate a video signal that is sent to display 460.

Further, processing system 120 may contain network adapter 465 which may be used to couple system 120 to external communication network 470, which may include or provide access to the Internet, an intranet, an extranet, or the like. Communications network 470 may provide access for processing system 120 with means of communicating and transferring software and information electronically. Additionally, communications network 470 may provide for distributed processing, which involves several computers and the sharing of workloads or cooperative efforts in performing a task, as discussed above. Network adaptor 465 may communicate to and from network 470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. An autonomous mobile robot, comprising:
a robot body having a height of at least one meter;
a first three-dimensional depth camera sensor affixed to a first side of the robot body proximate to the height at a first angle of incidence relative to a major floor surface directed along a first forward motion axis of the robot body;
a second three-dimensional depth camera sensor affixed to a second side of the robot body proximate to the height at a second angle of incidence relative to the major floor surface directed along a second backward motion axis of the robot body;
wherein the first and second three-dimensional depth camera sensors, in combination, comprise a 360-degree field of view of the major floor surface around the robot body, and the first angle of incidence is equal to the second angle of incidence; and
a processing system communicative with the first and second three-dimensional depth camera sensors and comprising non-transitory computing code which, when executed by at least one processor associated with the processing system, causes to be executed the steps of:
receiving of pixel data within the field of view from the first and second three-dimensional depth camera sensors;
obtaining missing or erroneous pixels from the pixel data;
comparing the missing or erroneous pixels to at least one template, wherein the at least one template comprises at least an indication of ones of the missing or erroneous pixels indicative of the robot body and a shadow of the robot body; and
outputting an indication of obstacles in or near the field of view based on the comparing.

2. The robot of claim 1, wherein the first and second angle of incidence relative to the major floor surface comprises a predetermined angle related to the field of view.

3. The robot of claim 1, wherein the field of view comprises at least two meters in radius.

4. The robot of claim 1, wherein an inception point of a radius of the field of view is less than 20 cm from the robot body or is on the robot body.

5. The robot of claim 1, wherein the first and second three-dimensional depth camera sensors are configured to rotate to provide the 360-degree field of view.

6. The robot of claim 1, wherein the obstacles are at least 2 cm in height.

7. The robot of claim 1, wherein the obstacles are selected from the group consisting of a step, slope, cliff, hole, and a shadow.

8. The robot of claim 1, wherein the first and second three-dimensional depth cameras have a frame rate of between about 15 and 90 fps.

9. The robot of claim 1, wherein the processing system further comprises communication capabilities for transceiving at least part of the comparing.

10. The robot of claim 1, wherein the processing system further comprises communication capabilities for transceiving at least the indication of obstacles.

11. The robot of claim 1, wherein the templates comprises an average of a plurality of sample depth images taken by the first and second three-dimensional depth camera sensors when the robot is in an open space with no obstacles in the field of view.

12. The robot of claim 1, wherein the missing or erroneous pixels are compared to a plurality of templates.

13. The robot of claim 1, wherein the processing system further comprises a second non-transitory computing code for governing operation of the robot based on the obstacle indication.

14. The robot of claim 13, wherein the governed operation is selected from the group consisting of a full stop of motion, planning, environment mapping, and safety monitoring.

15. The robot of claim 13, wherein the governed operation comprises a maneuver precise to +/−0.5 cm.

16. An autonomous mobile robot, comprising:
a robot body having a height of at least one meter;
a first three-dimensional depth camera sensor affixed to a first side of the robot body proximate to the height at a first angle of incidence relative to a major floor surface directed along a first forward motion axis of the robot body; and a second three-dimensional depth camera sensor affixed to a second side of the robot body proximate to the height at a second angle of incidence relative to the major floor surface directed along a second backward motion axis of the robot body;

wherein the first and second three-dimensional depth camera sensors, in combination, comprise a 360-degree field of view of the major floor surface around the robot body, and the first angle of incidence is equal to the second angle of incidence; and wherein a lateral outward reach of a field of view has a starting point on the robot body.

17. An autonomous mobile robot, comprising:

a robot body having a height of at least one meter;

a first three-dimensional depth camera sensor affixed to a first side of the robot body proximate to the height at a first angle of incidence relative to a major floor surface;

a second three-dimensional depth camera sensor affixed to a second side of the robot body proximate to the height at a second angle of incidence relative to the major floor surface;

wherein the first and second three-dimensional depth camera sensors, in combination, comprise a 360-degree field of view of the major floor surface around the robot body;

wherein the first angle of incidence relative to the major floor surface comprises the first three-dimensional depth camera sensor directed along a first forward motion axis of the robot body and the second angle of incidence relative to the major floor surface comprises the second three-dimensional depth camera sensor directed along a second backward motion axis of the robot body; and wherein the first angle of incidence relative to the major floor surface is equal to the second angle of incidence relative to the major floor surface.

* * * * *